United States Patent
Tanaka et al.

[15] 3,655,510
[45] Apr. 11, 1972

[54] PROCESS FOR PREPARING AMINO ACIDS FROM HYDROCARBONS

[72] Inventors: Katsunobu Tanaka; Kazuo Kimura, both of Machida-shi, Japan

[73] Assignee: Kyowa Hakko Kogyo Co., Ltd., Tokyo, Japan

[22] Filed: June 14, 1968

[21] Appl. No.: 736,958

Related U.S. Application Data

[63] Continuation of Ser. No. 695,329, Jan. 3, 1968, abandoned.

[30] Foreign Application Priority Data

Jan. 10, 1967 Japan..................................42/1579

[52] U.S. Cl. ............................................195/28 R, 195/111
[51] Int. Cl. ..........................................................C12b 1/00
[58] Field of Search....................195/3 H, 28, 29, 34, 47, 111

[56] References Cited

UNITED STATES PATENTS

| | | | |
|---|---|---|---|
| 2,771,396 | 11/1956 | Casida | 195/47 |
| 3,222,258 | 12/1965 | Iizuka et al | 195/3 H |
| 3,389,058 | 6/1968 | Kinoshita et al. | 195/111 |
| 3,411,990 | 11/1968 | Udagawa et al. | 195/47 |

*Primary Examiner*—A. Louis Monacell
*Assistant Examiner*—Gary M. Nath
*Attorney*—Craig, Antonelli & Hill

[57] ABSTRACT

A process for producing an amino acid, such as L-glutamic acid, L-lysine, L-ornithine, L-valine and L-homoserine, by fermentation from hydrocarbons as the main carbon source. The process is conducted by culturing a mixture of a microorganism capable of assimilating hydrocarbons and a microorganism capable of producing amino acids under aerobic conditions in an aqueous nutrient medium containing at least one hydrocarbon. Large yields of amino acids may be obtained by conducting a mixed culture of, for example, Micrococcus glutamicus with a hydrocarbon-assimilating microorganism such as Arthrobacter paraffineus or Brevibacterium ketoglutamicum.

14 Claims, No Drawings

PROCESS FOR PREPARING AMINO ACIDS FROM HYDROCARBONS

CROSS-REFERENCE TO RELATED APPLICATION

This application is a continuation of copending application Ser. No. 695,329, filed on Jan. 3, 1968 now abandoned.

This invention relates to a process for producing amino acids. More particularly, it relates to a process for the production of amino acids by fermentation. Even more particularly, the invention relates to a process for the production of various amino acids by fermentation from hydrocarbons as a raw material.

Recently, methods have been developed for fermentatively producing various useful substances from hydrocarbons using the so-called hydrocarbon-assimilating microorganisms which are capable of growing and proliferating in hydrocarbons serving as the main source of carbon. However, the type of fermentation product which may be obtained thereby has been limited up to now. Moreover, in most cases, a sufficient production yield has not been obtained.

The present invention is directed to a process for producing amino acids, which are widely used in many fields, using hydrocarbons as a starting material, hydrocarbons being relatively inexpensive. Accordingly, the present process has an applicability for large scale production.

One of the objects of the present invention is to provide an improved process for the preparation of amino acids which overcomes the disadvantages and deficiencies of the prior art methods.

Another object of the present invention is to provide a process for producing amino acids by fermentation may be carried out in an efficacious and simple manner.

A further object of the invention is to provide a method for the preparation of various amino acids by fermentation which may be carried out advantageously on an industrial scale using inexpensive starting materials to give a high yield of product.

These and other objects and advantages of the present invention will become apparent to those skilled in the art from a consideration of the following specification and claims.

In accordance with the present invention, the present inventors have found that various useful substances, particularly amino acids, can be produced in high yields from a culture medium using at least one hydrocarbon as the main source of carbon by culturing hydrocarbon-assimilating microorganisms together with microorganisms which have no or only a weak hydrocarbon-assimilating ability. By culturing together a microorganism capable of assimilating hydrocarbons and a microorganism capable of producing amino acids, it is possible to prepare amino acids in the culture liquor in high yield.

A wide range of hydrocarbon-assimilating microorganisms can be utilized in the process of the present invention since the direct producibility of amino acids is not taken into account with respect thereto. Thus, as to the hydrocarbon-assimilating microorganisms used in the present method, a wider range thereof can be employed than the case where amino acids are produced by a single assimilating microorganism. This point represents one of the greatest characteristics of the present invention. Another primary advantage of the present invention is the fact that various amino acids can be produced by sufficiently utilizing hydrocarbons which have been heretofore deemed difficult or inadequate to use in the case of a fermentation process wherein a single assimilating microorganism is employed. By the same token, unpurified raw materials may also be readily employed herein.

The scope of the present invention is not to be limited by the veracity of any theoretical explanation thereof, however, the present inventors have hypothesized that the fermentation mechanism of the present method is presumably based upon the following steps. The hydrocarbon is oxidized and decomposed to metabolic intermediates, for example, organic acids in the tricarboxylic acid cycle by the hydrocarbon-assimilating microorganism and, then, the resulting intermediates are converted into a useful amino acid by the action of the mixed microorganisms. It has been further observed that, even when a hydrocarbon-assimilating microorganism capable of producing an amino acid directly is used, the amino acid can be produced in a considerably higher yield in the case where a suitable amino acid-producing microorganism is selected and cultured together therewith, than in the case of a single culture. This fact is possibly ascribable to an efficient progress of metabolization brought about by a mutual supplementation of the metabolic intermediate, which often tends to become short.

Assimilating microorganisms belonging to genera such as Pseudomonas, Mycobacterium, Achromobacter, etc., in addition to the hydrocarbon-assimilating microorganisms which have been reported heretofore, i.e., Corynebacterium, Arthrobacter, Brevibacterium, Micrococcus, etc., can be used in the present invention. Examples of the results of fermentation carried out with combinations of these hydrocarbon-assimilating microorganisms with various kinds of amino acid-producing microorganisms are shown in Table 1.

TABLE 1

| Hydrocarbon Assimilating Microorganism | Amino Acid-Producing Microorganism | Amount of Amino Acid Formed |
|---|---|---|
| Arthrobacter paraffineous | Micrococcus glutamicus 534 | L-glutamic acid 35 mg/ml |
| Arthrobacter paraffineus | Micrococcus glutamicus 541 (ATCC 13058) | L-glutamic acid 32 mg/ml |
| Arthrobacter paraffineus | Micrococcus glutamicus 901 | L-lysine 2.0 mg/ml |
| Arthrobacter paraffineus | Micrococcus glutamicus U-1-3 | L-ornithine 1.8 mg/ml |
| Brevibacterium ketoglutamicum | Micrococcus glutamicus 615-313 | L-valine 1.5 mg/ml |
| Brevibacterium ketoglutamicum | Micrococcus glutamicus 534-Co147 | L-homoserine 2.0 mg/ml |

These tests were carried out as follows. The hydrocarbon-assimilating microorganism was pre-propagated in 20 ml. of a culture medium prepared in a 250 ml. flask and containing, by weight, 0.25% of yeast extract, 0.5% of meat extract, 0.5% of peptone and 0.25% of sodium chloride, the medium having a pH of 7.2. . The pre-propagation was effected with aerobic shaking for 24 hours.

Likewise, the amino acid-producing microorganism was pre-propagated in 20 ml. of a culture medium containing 2% of glucose, 1% of peptone, 0.5% of meat extract and 0.25 percent of sodium chloride, the medium having a pH of 7.2.

200 ml. of a fermentation medium containing 10% of hydrocarbons ( a mixture of n-paraffins having 9 to 18 carbon atoms), 0.1% of $KH_2PO_4$, 0.1% of $Na_2HPO_4 \cdot 12H_2O$, 0.05% of $MgSO_4 \cdot 7H_2O$, 0.002% of $MnSO_4 \cdot 4H_2O$, 0.01% of $FeSO_4 \cdot 7H_2O$, 0.001% of $ZnSO_4 \cdot 7H_2O$, 1% of $(NH_4)_2SO_4$, 0.1% of corn steep liquor, 1.0% of NZ-Amine (a trademark for a series of casein hydrolysates) and 2.5 γ/l of biotin was prepared in a 2 liter flask. The two kinds of microorganism pre-propagated for 24 hours were inoculated into the fermentation medium at the same time, and culturing was carried out at 30° C. with aerobic shaking for 4 days. The pH was adjusted to near 7.2 with a urea solution during culturing.

In the examples as shown in Table 1, the two kinds of seed cultures were mixed in equal volumes and inoculated at the same time. It is to be understood, however, that the most suitable mixing ratio and the time at which either or both of the microorganisms is added to the fermentation medium can be selected in each case, and the mixing ratio and time are not restricted to any particular or specific limits.

Either a synthetic culture medium or a natural nutrient medium is suitable for carrying out the fermentation process of the present invention as long as it contains the essential nutrients for the growth of the particular strains employed. Such nutrients are well known in the art and include substances such as a carbon source, a nitrogen source, inorganic compounds and the like which are utilized by the microorganisms employed in appropriate amounts. As a nitrogen source, various kinds of inorganic or organic salts or compounds, such as urea or ammonia or ammonium salts such as ammonium sulfate, ammonium chloride, ammonium nitrate, etc., or natural substances containing nitrogen such as corn steep liquor, peptone, meat extract, yeast extract, casein hydrolysates, fish meal, etc., may be employed. Mixtures of two or more of these substances may be used. Inorganic compounds which may be added to the culture medium include magnesium sulfate, potassium dihydrogen phosphate, potassium monohydrogen phosphate, sodium chloride, iron sulfate, as well as other salts of magnesium, iron manganese, zinc, calcium and the like. Mixtures of such inorganic compounds may be employed. Also, nutrients essential for the growth of the particular strains employed are added to the medium, for example, vitamins such as biotin, thiamine, pantothenic acid, nicotinic acid, etc.

Hydrocarbons are employed in the process of the present invention as the main source of carbon. Hydrocarbons which may be used include straight- and branched-chain paraffins (alkanes) having from nine to 18 carbon atoms, for example, n-nonane, n-decane, n-dodecane, n-hexadecane, n-octadecane, isodecane, etc. cycloparaffins, such as cyclohexane and cyclooctane, straight- and branched-chain olefins such as pentene-2, hexene-1, octene-1octene-2, etc., cycloolefins such as cyclohexene, aromatic hydrocarbons such as benzene, o-xylene, p-xylene, etc., and mixtures thereof, and mixed hydrocarbons such as kerosene, light oils, heavy oils, paraffin oils, etc.

Small amounts of other carbon sources such as glucose, fructose, mannose, galactose, sucrose, starch, starch hydrolysate, waste molasses, etc. may be used in the fermentation medium along with the hydrocarbons.

The fermentation of the mixed cultures is conducted under aerobic conditions, such as aerobic shaking of the culture or with stirring of a submerged culture, at a temperature of about 20° to 40° C. and a pH of about 4.0 to 9.0. After the completion of fermentation, the resultant amino acids are separated from the fermentation liquor by conventional means, such as ion exchange resin treatment, extraction with solvents, precipitation with metallic salts, chromatography, or the like.

The following examples are given merely as illustrative of the present invention and are not to be considered as limiting. Unless otherwise noted, the percentages therein and throughout the application are by weight per liter of water.

EXAMPLE 1

*Arthrobacter paraffineus* ATCC 15591 is inoculated into 20 ml. of a culture medium containing 0.25% of yeast extract, 0.5% of meat extract, 0.5% of pepton, and 0.25% of sodium chloride contained in a ml. flask. This medium has a pH of 7.2.

*Micrococcus glutamicus* 541 ATCC 13058 is inoculated into 20 ml. of a culture medium prepared in another 250 ml. flask and containing 2% of glucose, 0.5% of meat extract, 1% of peptone and 0.25% of sodium chloride. This nutrient medium also has a pH of 7.2.

Both microorganisms are cultured at 30° C. with aerobic shaking for 24 hours. The resultant cultures are then inoculated into 200 ml. of a fermentation medium contained in a 2 liter flask and having the following composition:
10% hydrocarbons (a mixture of n-paraffins of 9 to 18 carbon atoms)
0.1% $KH_2PO_4$
0.1% $Na_2HPO_4 \cdot 12H_2O$
0.05% $MgSo_4 \cdot 7H_2O$
0.002% $MnSO_4 \cdot 4H_2O$
0.01% $FeSO_4 \cdot 7H_2O$
0.002% $ZnSO_4 \cdot 7H_2O$
1% $(NH_4)_2SO_4$
0.1% corn steep liquor This medium has a pH of 7.2.

Fermentation is then conducted by culturing the mixture of microorganisms at 30° C. with aerobic shaking for 4 days. The decrease in pH is adjusted to close to 7.2 by adding $NH_4OH$ to the medium while culturing. At the completion of fermentation, 35 mg./ml. of L-glutamic acid is formed in the culture liquor.

Calcium hydroxide is added to the fermentation liquor to adjust the PH thereof to 9.0, and then the medium is heated. After the microorganism cells have been filtered off, the filtrate is concentrated. By adjusting the pH to 3.2 with hydrochloric acid and cooling the concentrated filtrate, the calcium salt of L-glutamic acid is crystallized out. By filtering the resulting crystals, 5.2 grams of the calcium salt of L-glutamic acid is obtained.

EXAMPLE 2

*Brevibacterium ketoglutamicum* ATCC 15588 is inoculated into 20 ml. of a nutrient medium containing 0.25% of yeast extract, 0.5% of meat extract, 0.5% of peptone and 0.25% of sodium chloride, and having a pH of 7.2, which is prepared in a 250ml. flask. *Micrococcus glutamicus* 901 ATCC 13287 is inoculated into 20 ml. of a medium containing 2% of glucose, 1% of peptone, 0.5% of meat extract and 0.25% of sodium chloride, and having a pH of 7.2, which is prepared in another 250 ml. flask.

Both microorganisms are cultured at 30° C. with aerobic shaking for 24 hours. The resultant cultures are then inoculated into 200 ml. of a fermentation medium contained in a 2 liter flask and comprising the following components:
10% hydrocarbons (a mixture of n-paraffins of 9 to 18 carbon atoms)
0.1% $KH_2PO_4$
0.1% $Na_2HPO_4 \cdot 12H_2O$
0.05% $MgSO_4 \cdot 7H_2O$
0.002% $MnSO_4 \cdot 4H_2O$
0.01% $FeSO_4 \cdot 7H_2O$
0.002% $ZnSO_4 \cdot 7H_2O$
1% $(NH_4)_2SO_4$
0.1 percent corn steep liquor
1 percent NZ-Amine
10γ/1 biotin This medium has a pH of 7.2

Fermentation is then carried out with the mixture of microorganisms by culturing at 30° C. under aerobic shaking for 4 days. The decrease in the pH of the medium is adjusted to near 7.2 by adding ammonium hydroxide to the medium while culturing. At the completion of fermentation, 2.0 mg./ml. of L-lysine is formed in the culture medium.

After the microorganism cells have been filtered off by centrifugal separation, the filtrate is acidified with hydrochloric acid. The L-lysine is purified and separated in accordance with a conventional method using an ion exchange resin. As a result, 0.31 grams of L-lysine hydrochloride is obtained.

EXAMPLE 3

*Pseudomonas aeruginosa* ATCC 15246 is inoculated into 20 ml. of a nutrient medium containing 0.25percent of yeast extract, 0.5 percent of meat extract, 0.5 percent of peptone and 0.25 percent of sodium chloride, and having a pH of 7.2, which was prepared in a 250 ml. flask. Culturing is conducted at 30° C. with aerobic shaking for 24 hours. The resultant culture is then inoculated into 200 ml. of a fermentation medium contained in a 2 liter flask and having the following composition:
10 percent kerosene
0.1% $KH_2 PO_4$
0.1$Na_2HPO_4 \cdot 12H_2O$
0.05% $NgSO_4 \cdot 7H_2O$
0.002% $MnSO_4 \cdot 4H_2O$
0.01% $FeSO_4 \cdot 7H_2O$
0.002% $ZnSO_4 \cdot 7H_2O$
1% $(NH_4)_2SO_4$
0.1percent corn steep liquor This medium has a pH of 7.2.

Culturing is then conducted at 30° C. with aerobic shaking for 4 days. After 24 hours, a culture of *Micrococcus glutamicus* 541 ATCC 13,058 is added to the fermentation medium. This latter culture is obtained by inoculating *Micrococcus glutamicus* 541 ATCC 13,058 into 20 ml. of a medium contained in another 250 ml. flask and comprising 2 percent of glucose, 1 percent of peptone, 0.5 percent of meat extract and 0.25 percent of sodium chloride, the medium having a pH of 7.2, and culturing at 30° C. with aerobic shaking for 24 hours. During the fermentation of the mixed cultures, the lowering in the pH of the medium is adjusted to near 7.2 by adding NH$_4$OH to the medium. At the completion of fermentation 12 mg./ml. of L-glutamic acid is found to be formed in the fermentation liquor.

After filtering off the microorganism cells by centrifugal separation, the filtrate is concentrated. By adjusting the pH to 3.2 with hydrochloric acid, and cooling the filtrate, 2.1 grams of raw crystals of L-glutamic acid is obtained. By recrystallization thereof, 1.5 grams of L-glutamic acid is obtained.

It should be clear from the above that the principle of the present invention involves the preparation of amino acids by fermentation using hydrocarbons as the main source of carbon, wherein a microorganism capable of assimilating hydrocarbons and a microorganism capable of producing an amino acid are cultured together in mixture. Accordingly, to the present invention is not limited to any particular types of microorganisms, but is applicable to all microorganisms which fall within these two defined categories. Microorganisms capable of assimilating hydrocarbons are known in the art, and some of these have been exemplified above. Likewise, microorganisms capable of producing amino acids by fermentation are well known in the art, and these are all readily employable in the process of the present invention.

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing an amino acid by fermentation from hydrocarbons which comprises culturing a mixture of (1) a microorganism capable of assimilating hydrocarbons and (2) a microorganism capable of producing amino acids, microorganism (1) and microorganism (2) being different microorganisms, under aerobic conditions in an aqueous nutrient medium containing at least one hydrocarbon as the main carbon source, accumulating the amino acid in the resultant culture liquor, and recovering said amino acid from said culture liquor.

2. The process of claim 1, wherein the hydrocarbon-assimilating microorganism belongs to a genus selected from the group consisting of *Pseudomonas, Mycobacterium, Achromobacter, Corynebacterium, Arthrobacter, Brevibacterium* and *Micrococcus*.

3. The process of claim 1, wherein the amino acid-producing microorganism is *Micrococcus glutamicus*.

4. The process of claim 3, wherein said amino acid is selected from the group consisting of L-glutamic acid, L-lysine, L-ornithine, L-valine and L-homoserine.

5. The process of claim 1, wherein the hydrocarbon used as the main carbon source is an N-paraffin having from 9 to 18 carbon atoms.

6. The process of claim 1, wherein seed cultures of both microorganisms are added at the same time to said nutrient medium.

7 The process of claim 1, wherein seed cultures of the microorganisms employed are added to the nutrient medium at different times.

8. The process of claim 1, wherein the amino acid-producing microorganism belongs to the genus *Micrococcus*.

9. A process for producing an amino acid by fermentation from hydrocarbons which comprises culturing a mixture of (1) *Micrococcus glutamicus* and (2) a microorganism capable of assimilating hydrocarbons and belonging to a genus selected from the group consisting of *Pseudomonas, Mycobacterium, Achromobacter Corynebacterium, Arthrobacter, Brevibacterium* and *Micrococcus*, microorganism (1) and microorganism (2) being different microorganisms, under aerobic conditions in an aqueous nutrient medium containing at least one hydrocarbon as the main carbon source, accumulating the amino acid in the resultant culture liquor, and recovering said amino acid from said culture liquor.

10. The process of group 9, wherein said amino acid is selected from the group consisting of L-glutamic acid, L-lysine, L-ornithine, L-valine and L-homoserine.

11. The process of claim 9, wherein the hydrocarbon used as the main carbon source is an N-paraffin having from nine to 18 carbon atoms.

12. The process of claim 9, wherein culturing is carried out at a temperature of about 20° to 40° cC.nd at a pH of about 4.0 to 9.0.

13. A process for producing an amino acid by fermentation from hydrocarbons which comprises culturing a mixture of (1) *Micrococcus glutamicus* ATCC 13,058 or *Micrococcus glutamicus* ATCC 13,287 and (2) *Arthrobacter paraffineus* ATCC 15,591, *Brevibacterium Ketoglutamicum* Atcc 15,588 or *Pseudomonas aeruginosa* ATCC 15,246 under aerobic conditions in an aqueous nutrient medium containing at least one hydrocarbon as the main carbon source at a temperature of about 20° to 40° C. and at a pH of about 4.0 to 9.0, accumulating the amino acid in the resultant culture liquor, and recovering said amino acid from said culture liquor. 18

14. The process of claim 13, wherein said amino acid is selected from the group consisting of L-glutamic acid, L-lysine, L-ornithine, L-valine and L-homoserine.

* * * * *